Aug. 8, 1967 W. W. OELKE ETAL 3,334,984
INSULATED EDGE ROLLER FOR WINDOW GLASS MACHINE
Filed Oct. 18, 1962 2 Sheets-Sheet 1

Waldemar W. Oelke, INVENTORS
James E. Mambourg,
Curtis A. Mewbourne
and Alfred E. Badger
Nobbe & Swope
ATTORNEYS Aug. 8, 1967    W. W. OELKE ETAL    3,334,984
INSULATED EDGE ROLLER FOR WINDOW GLASS MACHINE
Filed Oct. 18, 1962    2 Sheets-Sheet 2

Waldemar W. Oelke, INVENTORS
James E. Mambourg,
Curtis A. Newbourne
and Alfred E. Badger
Nobbe & Swope
ATTORNEYS

United States Patent Office 3,334,984
Patented Aug. 8, 1967

3,334,984
INSULATED EDGE ROLLER FOR WINDOW GLASS MACHINE
Waldemar W. Oelke, Rossford, and Alfred E. Badger, Maumee, Ohio, and James E. Mambourg and Curtis A. Mewbourne, Shreveport, La., assignors to Libbey-Owens-Ford Glass Company, Toledo, Ohio, a corporation of Ohio
Filed Oct. 18, 1962, Ser. No. 231,345
6 Claims. (Cl. 65—199)

The present invention relates broadly to the production of sheet or window glass and more particularly to a method and apparatus for continuously drawing a ribbon of improved quality and greater usable width from a mass of molten glass.

Window or sheet glass is distinguished from plate glass by the fact that it is flat drawn directly into final form and, at the same time, is given a natural fire finish so that it requires no subsequent treatment to impart smoothness and transparency.

Such sheet glass can, of course, be much more simply and cheaply produced than can ground and polished plate glass, but its disadvantage has been in its inherent waviness and its susceptibility to distortion type defects. Indeed, in the past, these defects have come to be considered as necessary evils in, if not distinguishing characteristics of, commercial sheet and window glass.

"Distortion" in window glass is due primarily to lack of thickness uniformity or, differently, expressed, to alternate thick and thin areas that occur in the glass ribbon as it is being drawn. There are several varieties of distortion, known in the art by various names such as "long wave distortion," "short wave distortion," "hammer," "batter," etc. and we have found that all of these result from a lack of sufficiently uniform temperature conditions from side to side of the mass of molten glass from which the sheet is being drawn; from the adverse influence of thermally induced air or convection currents that moved toward, along and around the newly formed sheets; and/or from contact with or proximity to forming or treating elements that chill or otherwise interfere with attaining uniformity of temperature across the sheet as it rises from the mass of molten glass. Among such treating elements are the means commonly employed for maintaining the ribbon of glass to width as it is pulled from the mass of molten glass.

Briefly stated the present invention is based on our discovery of an improved width maintaining means that includes cupped or dimpled glass contacting rolls for holding the newly formed sheet to width and of a method of operating the same which eliminates or renders unnecessary certain elements in existing window glass drawing machines that have heretofore been responsible for much of the distortion in the finished glass.

It is a primary object of the invention to materially improve the quality and character of flat drawn window glass and to increase the production capacity of present drawing equipment.

A further object is to provide an improved form of width maintaining device that will operate more efficiently for its intended purpose with a minimum of adverse effect on the glass adjacent thereto or in contact therewith.

Another object is to reduce undesirable chilling of the molten glass at the source of the ribbon and to so reduce devitrification and dog metal in this area.

Still another object is to increase the width of usable sheet that can be drawn from a working receptacle of a given size and to minimize the amount of waste glass in the selvage edge of the glass ribbon.

A further object is to greatly reduce the number of, if not to entirely eliminate the open flames required in and around the zone of sheet formation.

Further objects and advantages will become more apparent during the course of the following description, when taken in connection with the accompanying drawings wherein like numerals are employed to designate like parts throughout the same.

Figure 1:
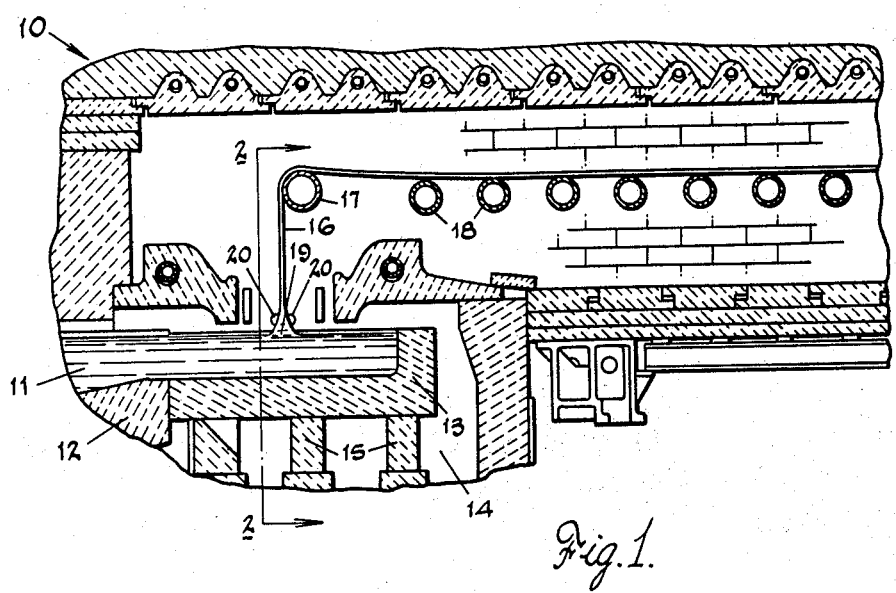
FIG. 1, is a longitudinal, vertical, sectional view through a conventional window glass drawing machine of the Colburn type incorporating the apparatus of the present invention.

Although the width maintaining device of this invention is in no way restricted to use with any specific kind of window glass forming machine and, indeed, may be readily adapted to any one of a number that are now in commercial use, it is believed to have its greatest potential when employed in the so-called Colburn type of window glass drawing machine and will be specifically described in that connection here.

Referring now more particularly to the drawings, there is designated in its entirety by the numeral 10 a representative Colburn type window glass drawing machine. In operating such a machine, a supply of molten glass 11 is created and maintained by melting raw glass making materials in the forward or melting end of a conventional glass tank furnace. This molten glass then moves progressively through a refining tank (not shown) and into the cooling or conditioning chamber 12 of the furnace, from which it passes to a working receptacle or draw pot 13 supported in a heated pot chamber 14 on stools 15.

In the production of window glass on machines of this character a ribbon or continuous sheet of glass 16 is drawn vertically from the molten glass in the draw pot 13 for a short distance and then bent into the horizontal plane over a bending roll 17 from which it is conveyed, on machine rolls 18, into and through an annealing lehr (not shown).

As the sheet 16 is pulled from the mass of molten glass it forms a meniscus 19 at its source and, unless means are provided to prevent it, the ribbon being drawn tends to neck-down progressively, or pull to a thread, and the sheet will soon be lost. This is chiefly due to the surface tension of glass which imparts a tendency to draw into rod rather than sheet form.

In common practice it has been customary to prevent the necking-down of the sheet by providing water cooled width maintaining members of various kinds to contact the opposite margins of the rising sheet at its base or meniscus and chill or otherwise act on the sheet edges in a manner to prevent or retard the normal tendency of the ribbon 16 to narrow and move inwardly before it reaches the bending roll 17.

The most successful of these previously known width maintainers have been in the form of pairs of water cooled knurled rolls that were mounted for rotation at opposite sides of the glass sheet with the opposed knurled surfaces of each pair engaging opposite sides of the margin of the rising sheet at the meniscus. By rotating such knurls at a speed somewhat slower than the speed at which the ribbon is being drawn they act to produce a chilled margin of considerable width at each edge of the glass. In cross-section these margins exhibit a rounded shape at their extremities; adjacent converging, pinched-in areas where the knurled rolls actually contact the glass; an enlarged area just inwardly of the innermost point of contact by the knurls, where the excess glass is squeezed out; and a second tapering area inwardly of the enlarged area where the glass surfaces converge to the approximate thickness of the main body of the ribbon.

As indicated above these knurled rolls are probably the most effective form of width maintainers that had been devised up to the time of the present invention. However, they have a number of drawbacks. In the first place, as will be evident from the description above, the margins formed by the knurls, and which were responsible for holding the sheet to width, were of course marked by the knurled surface of the rolls and presented alternate thick and thin portions making up what might be termed a selvage edge or margin of unusable glass. This was of considerable width and, since it had to be trimmed from the finished sheet represented a serious waste.

Also the fact that this selvage edge or frame was chilled by the knurls made it stiffen quickly and prevented it from conforming properly to and lying flat on the bending roll when it was drawn thereover. This necessitated the introduction of open flames along the edges of the glass sheet to soften the chilled margins sufficiently to permit them to bend into and move flatly along the horizontal plane; and we believe that such open flames have been responsible for much of the uncontrolled air movement in the zone of sheet formation and for consequent distortion defects in the sheet.

Another objectionable feature of the knurled rolls is that their cooling action caused the molten glass beneath the knurled rolls to cool and slowly devitrify. The resulting "dog" metal had to be dug out occasionally and operation of the machine was interrupted during these periods.

It has already been indicated that a principal feature of the present invention lies in the fact that its novel width maintaining means not only function efficiently for their intended purpose but that they also eliminate many if not all of the objectionable features of the prior devices that have been used to attain a similar result.

Figure 2:
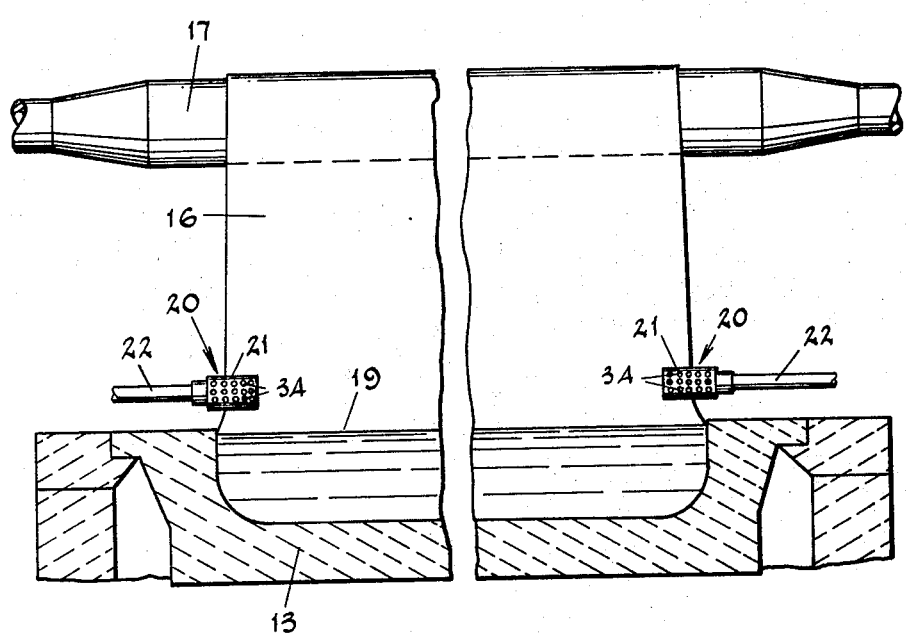
FIG. 2 is a transverse sectional view taken substantially along the line 2—2 in FIG. 1.

Thus the width maintainers of this invention employ pairs of smooth surfaced, dimpled or cupped roll members 20 positioned to engage opposite marginal portions of the rising sheet 16 at the meniscus 19 (FIGS. 1 and 2).

The dimpled rolls of the invention are similar in shape and size to the previously known knurled rolls used for this purpose and are supported, operated and preferably water cooled in a generally similar manner, i.e., pretty much as illustrated and described in patents to I. W. Colburn, 1,248,809, issued Dec. 4, 1917 and to J. L. Drake et al., 2,267,604, issued Dec. 23, 1941.

However, the rolls of this invention differ importantly from the known knurled width maintaining rolls (1) by having a smooth, cupped surface rather than a rough, knurled surface, (2) by having a modified interior structure and (3) by being operated at a critically higher temperature.

With regard first to the temperature feature, it was found necessary, in operating the prior known knurled rolls, to cool these rolls sufficiently to avoid sticking and wrapping of the glass around them and also to protect their shafts from the furnace heat. Thus, the temperature of the glass in the meniscus 19 in a conventionally operated Colburn type window glass machine is normally around 1700° F. and the conventional operating temperature for the knurled width maintaining rolls is around 550° F. at the middle area of the knurl.

As indicated above this magnitude of cooling has proved objectionable for a number of reasons. In the first place, it produces a thickened edge on the sheet which reduces its saveable width; second, it is necessary to employ so-called edge fires to reheat the cooled and thickened margins of the sheet before they pass over the bending roll 17; thirdly, the presence of these edge fires is a contributing factor in setting up distortion over the sheet because they promote the formation of convection currents in the drawing area and zone of sheet formation; and, finally, the conventional knurl cooling causes devitrification of the molten glass in the pot directly beneath the knurls and the resulting "dog" metal must be removed from time to time with a corresponding loss of production.

These objectionable features are alleviated where not completely overcome according to the present invention by the provision of so-called "hot running" width maintaining rolls which operate at a temperature more nearly approaching the temperature of the glass with which the rolls are in contact. At first glance this may seem like an obvious expedient. However, it has never before been considered feasible and we have found that it cannot be adequately practiced with the conventional knurled roll construction that is in common use.

Thus the metals and alloys normally used in width maintaining rolls (stainless steel, for example) will stick to the glass in the meniscus whenever the rolls reach a temperature of roughly 1100° F. and, because of the type of "dead end" cooling heretofore employed with the knurled rolls, even when such rolls are operated at a level of around 550° F., the open end of the roll will be at a temperature of around 1000° F. or close to the sticking temperature. Consequently, with any attempt to materially increase the operating temperature over the major part of the length of the roll, at least one part will be at a temperature at which the glass will stick and wrap on the roll. Moreover, the sharp points or protrusions on the conventional knurled rolls act as sticking centers for the glass.

The improved cupped width maintaining rolls of the present invention, on the other hand, can be "run hot," i.e., operated at a temperature that is high enough to prevent chilling of the glass to a point where an objectionably thickened edge margin is formed or where it is necessary to reheat the edges before passage of the sheet over the bending roll but which, at the same time, is substantially uniform throughout the length of the rolls and low enough to provide an adequate safety factor against sticking and wrapping up of the glass.

The internal structure of the recessed width maintaining rolls of this invention which makes possible the improved operation and temperature gradient as well as the desirable increased temperature operating level and the advantages to be gained thereby will be readily understood from a description of the cupped or recessed roll structure as illustrated in FIGS. 3 to 6 of the drawings.

Figure 3:
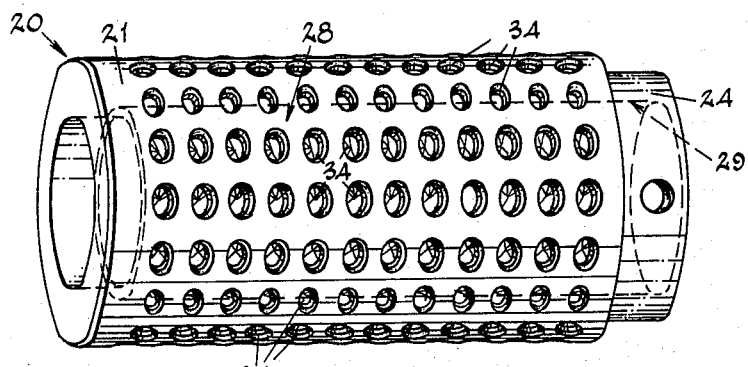
FIG. 3 is a perspective view of a preferred form of cupped or dimpled roll member for use in the width maintaining device of the invention.
Figure 4:
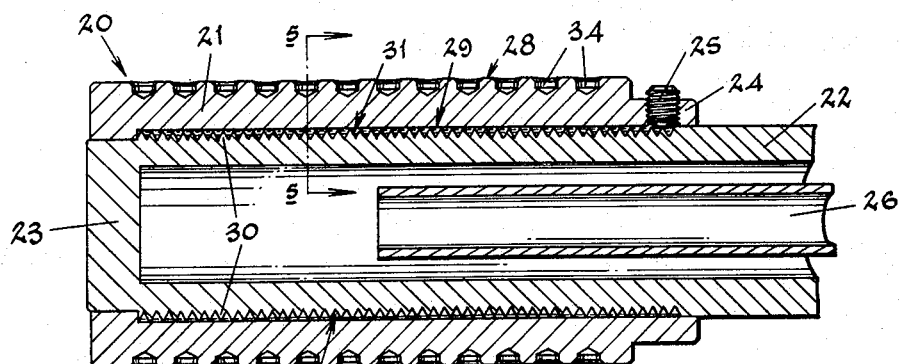
FIG. 4 is a longitudinal, sectional view through the member of FIG. 3.

Thus, as best shown in FIGS. 3 and 4 the recessed width maintaining rolls of the invention are similar in general structure to the known knurled rolls in that they are preferably made up of a cylindrical body portion or shell 21 carried on the end of a hollow shaft or barrel 22. However, the shaft 22 of applicants' structure preferably extends through the shell 21 and is closed by an end wall 23 which also forms a closure for the outer end of the core hole of the shell. The shell 21 and shaft 22 may be maintained in assembled relationship by means of a collar 24 provided with set screws 25 and a cooling fluid such as water is supplied to the shaft from the open end of a pipe 26 positioned centrally thereof and terminating short of the closed end.

As indicated above the type of internal construction generally used in the prior knurled rolls failed to provide uniform cooling of the glass contacting surface of the knurls and made it impossible to run the rolls at anything like a uniform temperature throughout that approached the temperature of the glass. This was because the open end of the knurled body portion of the prior known rolls was simply threaded onto the end of the hollow shaft and resulted in a non-uniform temperature condition with the open end of the roll being always at a temperature higher than the remaining area. In fact, the knurled roll temperature normally varied in the conventional operation of these rolls from about 1000° F. at the open end, through roughly 550° F. in the intermediate area, to around 650° F. at the closed end.

One of the important features of applicants' invention resides in insulating the shell 21 of their improved width maintaining rolls from the coolant in the hollow shaft 22. This permits the temperature of the shell 21, and particularly the smooth glass contacting surface 28, to be higher than heretofore and to equalize or balance out so that a substantially uniform temperature can be maintained from one end of the roll to the other.

Figure 5:
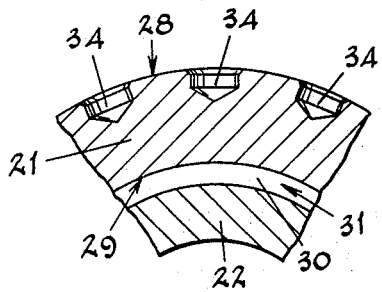
FIG. 5 is a fragmentary sectional view, on an enlarged scale, taken substantially along the line 5—5 in FIG. 4.

This insulating and temperature equalizing feature may be provided in a number of different ways and with a variety of insulating media. However, a dead air layer or layers are probably the most practical and a preferred construction, which has given excellent results in actual practice, is illustrated in FIGS. 4 and 5 of the drawings. As there shown, the dimpled shell or body portion 21 is smooth finished on the inside surface 29 and the end of the shaft 22 is threaded as at 30 for a length substantially equal to the length of the shell 21 with the threads around the end wall 23 being machined off. Preferably, the remainder of the threads are also machined down slightly, for example around .015", to provide a better bearing surface and to insure the threaded portion of the shaft having an accurate and uniform outside diameter. In assembling, the dimpled shell 21 is slip fitted over the threaded end of the shaft 24 and held in place by the set screws 25.

With this arrangement there is provided a series of spirally arranged dead air chambers 31 between the cooling medium inside the shaft 22 and the shell 21; and operating temperatures with a roll of this design have proved to be uniform from end to end within a range of 950° F., plus or minus 25°, at a furnace temperature of 1700° F.

Of course a similar result may be obtained by employing a smooth surfaced shaft with an internally threaded shell. It will also be appreciated that, in lieu of the series of spirally arranged insulating air chambers 31, a single insulating air space or a series of more or less uniformly arranged air spaces may be provided between the shaft 22 and the shell 21 by employing a smooth outside surface on the former as well as a smooth finished inside surface on the latter and by mounting the shaft 22 in spaced relation to the shell 21 throughout or at intervals along its length.

However, at least insofar as the single air space is concerned, tests have indicated that the temperature of the roll is extremely sensitive to variations in thicknesses of such a single or continuous air space and this sensitivity is aggravated by the fact that the shell expands more than the shaft under operating conditions, due to the relatively cold interior of the shaft, so that it is more difficult to control the temperature with this type of arrangement.

Figure 6:
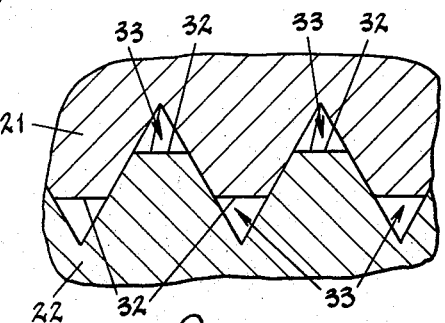
FIG. 6 is an enlarged, fragmentary, sectional view similar to FIG. 4, but illustrating a modified form of heat barrier.

This temperature sensitivity factor is clearly indicated by further work that has been carried out in connection with the modified form of insulating and temperature equalizing construction illustrated in FIG. 6. This construction has also operated very satisfactorily and is provided by internally threading the shell 21, externally threading the shaft 22 and providing a heat barrier by machining off from .010" to .020" from the peaks of .054" threads on the shaft and shell as shown at 32 to provide a series of dead air channels 33.

To determine the effectiveness of these channels as a heat barrier, tests were made in a laboratory furnace at a temperature of 1350° F. using a water inlet temperature of 100° F. which produced temperatures on the outside surface of the rolls that ranged from 350 to 400° F. with conventional threads. The removal of .010" from both threads acted to balance the temperature from end to end of the roll and increased it to approximately 425° F. An additional removal of .005" from the peaks (giving a .015" total) resulted in an increase of temperature to approximately 550° F. and an additional removal of .005" (giving a .020" total) raised the temperature to approximately 650° F.

In actual practice the most efficient condition seemed to be attained, with the glass at a temperature of 1700° F. and a water temperature of 100° F., by removing .018" from the peaks of both .054" deep threads. Under these conditions the surface temperatures of the stainless steel rolls were found to be roughly 950° F. and substantially uniform from end to end of the roll. Also a gain of 5" in the saveable width of the sheet was attained.

It will be apparent from the foregoing discussion of FIGS. 3 to 6 that the internal structure of applicants' improved width maintaining rolls makes it possible to operate such rolls, under presently existing conditions in the window glass art, that is not only substantially uniform from end to end but is also roughly 400° F. above the temperature at which the prior knurled rolls could be operated.

However, it will be understood that, with variations in the temperature of the glass at the meniscus that come about by variations or improvements in window glass drawing techniques, corresponding alterations in the operating temperatures of the width maintaining rolls may be necessary or desirable. Also, changes in the nature or compositions of the metals or alloys from which the rolls are made may result in corresponding changes in the temperature at which the glass will stick to or wrap up on the hot running knurls and such a higher or lower sticking temperature might permit a correspondingly higher or necessitate a correspondingly lower roll operating temperature.

Consequently, no specific temperature or range of temperatures can be said to be critical because the important point is that the width maintaining rolls should always be hot enough to avoid the formation of objectionable thickened portions in the margin of the sheet and/or to eliminate the necessity for using edge fires to reheat the margins of the sheet before it passes over the bending roll while, at the same time, being cool enough to provide an adequate factor of safety against the glass sticking to and wrapping up on any part of the roll.

Stated in its simplest form this phase of the invention requires that the rolls should be "run hot" (preferably above 850° F.) but at a temperature from end to end below their sticking point.

The third feature of the improved rolls has to do with the type of surface which they present to the portion of the glass in the meniscus which they contact. As pointed out above the objections to the prior known knurled rolls included the facts that they had an excessive chilling effect on the glass and that they presented a rough surface with sharp projections that acted as sticking centers for the glass. Also they were fast wearing.

The width maintaining rolls of this invention, on the other hand, are highly wear resistant because they present a smooth outside contact surface 28 to the glass. However, this smooth surface is provided with a pattern of holes, cups or recesses 34 therein (FIGS. 3 and 5); and when pairs of such rotating, dimpled or cupped rolls are operated to press against the opposite surfaces of the rising sheet they function to grip the glass in the meniscus 19 more effectively than has heretofore been possible. Thus, the soft glass is pushed into the holes 34 which serve as anchors to grip and draw the sheet 16 and hold it to width. The soft glass does not contact the bottoms of the holes because of cushions of air that are entrapped therein in normal operation. Also because of this, relatively little cooling of the glass takes place in the areas where the holes have been drilled and the spacing between the holes may be made such that the actual area of glass-to-metal contact may be decreased by about one third with a corresponding decrease in heat transfer from the glass to the metal.

Obviously, holes of various shapes may be formed in the roll surfaces and one preferred shape has been illustrated in FIGS. 3 to 5. As there shown the holes 34 are generally cylindrical in shape, about 1/16" deep and spaced about 5/16" apart, with a cone-shaped bottom and a diameter of about 3/16".

However, similar holes with countersunk tops and holes of generally inverted cone shape have also given good results in use and practically any shape and size of hole that will function in a similar manner can be employed, although it is desirable to avoid shapes that may act to objectionably "tear" or form bubbles in the glass as it is withdrawn therefrom.

The holes or recesses may also be arranged in a wide variety of patterns and, while one preferred pattern is shown in FIG. 3, different patterns employing a staggered arrangement and/or alternate holes of larger and smaller sizes arranged in different ways have also functioned satisfactorily. In fact, within reason, we do not consider variations in the pattern or arrangement of holes to be critical to the success of the invention.

As pointed out above the pairs of recessed rolls of this invention act to grip the ribbon or rising sheet therebetween and, as the glass of the ribbon or meniscus is pushed into the recesses, to effectively draw the sheet and hold it to width. Thus, the rolls may be said to contact or engage the marginal surfaces of the rising ribbon along spaced, constantly shifting transverse areas and to run "hot" although at a temperature below the sticking point of the rolls to the glass in the ribbon.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. A width maintaining roll for use in rolling contact with a marginal surface of a newly formed glass ribbon in a sheet glass machine, comprising a cylindrical body portion including an outer cylindrical member and an inner cylindrical member disposed within said outer member, means for supplying a cooling fluid to said inner cylindrical member, said outer cylindrical member being closed at one end and having a smooth ribbon contacting outer surface, depressions extending inwardly from said outer surface, said depressions being closed at their inner ends and isolated from one another, and means for spacing said inner cylindrical member from said outer cylindrical member to provide an annular air space surrounding said inner cylindrical member for insulating the cooled interior thereof from said outer surface.

2. A width maintaining roll as defined in claim 1, in which the interior surface of the outer cylindrical member is in substantial contact with the outer surface of the inner cylindrical member and one of said surfaces is threaded to provide a continuous spirally arranged annular air space between said surfaces.

3. A width maintaining roll as defined in claim 1, in which said inner cylindrical member is threaded into said outer cylindrical member and with the height of the raised part of the thread on at least one of said members being less than the depth of the grooved part of the thread on the other member to provide at least one continuous spirally arranged air passage within said body portion.

4. A width maintaining roll as defined in claim 1, in which said depressions are substantially cylindrical.

5. A width maintaining roll as defined in claim 1, in which the bottoms of said depressions are in the general form of inverted cones.

6. A width maintaining roll as defined in claim 1, in which said depressions are arranged in generally symmetrical rows around the circumference of said outer cylindrical member.

References Cited

UNITED STATES PATENTS

| | | | |
|---|---|---|---|
| 1,598,073 | 8/1926 | Ferngren | 65—91 |
| 1,732,042 | 10/1929 | Fox | 65—251 |

FOREIGN PATENTS

| | | |
|---|---|---|
| 598,288 | 12/1925 | France. |
| 855,202 | 11/1952 | Germany. |
| 252,956 | 6/1926 | Great Britain. |
| 540,381 | 10/1941 | Great Britain. |
| 116,460 | 7/1959 | U.S.S.R. |

DONALL H. SYLVESTER, *Primary Examiner.*

D. CRUPAIN, *Assistant Examiner.*